(12) United States Patent
Vallance

(10) Patent No.: US 9,306,195 B2
(45) Date of Patent: Apr. 5, 2016

(54) ELECTROCHEMICAL CELLS

(75) Inventor: Michael Alan Vallance, Loudonville, NY (US)

(73) Assignee: General Electric Company, Niskayuna, NY (US)

( * ) Notice: Subject to any disclaimer, the term of this patent is extended or adjusted under 35 U.S.C. 154(b) by 480 days.

(21) Appl. No.: 13/248,671

(22) Filed: Sep. 29, 2011

(65) Prior Publication Data

US 2013/0084485 A1 Apr. 4, 2013

(51) Int. Cl.

| | |
|---|---|
| *H01M 2/22* | (2006.01) |
| *H01M 2/00* | (2006.01) |
| *H01M 4/40* | (2006.01) |
| *H01M 2/02* | (2006.01) |
| *H01M 4/42* | (2006.01) |
| *H01M 10/36* | (2010.01) |
| *C23F 13/14* | (2006.01) |
| *H01M 4/38* | (2006.01) |
| *H01M 4/58* | (2010.01) |
| *H01M 10/38* | (2006.01) |
| *H01M 10/39* | (2006.01) |
| *H01M 10/42* | (2006.01) |
| *C23F 13/10* | (2006.01) |

(52) U.S. Cl.
CPC ............. *H01M 2/0265* (2013.01); *C23F 13/10* (2013.01); *C23F 13/14* (2013.01); *H01M 4/381* (2013.01); *H01M 4/382* (2013.01); *H01M 4/42* (2013.01); *H01M 4/582* (2013.01); *H01M 10/365* (2013.01); *H01M 10/38* (2013.01); *H01M 10/39* (2013.01); *H01M 10/399* (2013.01); *H01M 10/4235* (2013.01)

(58) Field of Classification Search
CPC ..... H01M 4/381; H01M 4/42; H01M 10/365; H01M 10/381
See application file for complete search history.

(56) References Cited

U.S. PATENT DOCUMENTS

| | | | | |
|---|---|---|---|---|
| 3,617,387 | A | * 11/1971 | Grulke et al. | 429/162 |
| 4,609,596 | A | * 9/1986 | Hitchcock et al. | 429/104 |
| 5,716,731 | A | * 2/1998 | Goetzer et al. | 429/103 |
| 6,294,287 | B1 | 9/2001 | Lee et al. | |
| 7,498,095 | B2 | 3/2009 | Finnerty et al. | |
| 7,824,806 | B2 | 11/2010 | Visco et al. | |
| 7,829,212 | B2 | 11/2010 | Visco et al. | |
| 7,947,393 | B2 | 5/2011 | Moore et al. | |
| 2005/0106461 | A1* | 5/2005 | Moore et al. | 429/229 |
| 2008/0044725 | A1 | 2/2008 | Sadoway et al. | |
| 2010/0062331 | A1* | 3/2010 | Vallance et al. | 429/176 |
| 2010/0178532 | A1 | 7/2010 | Shapiro et al. | |
| 2010/0178546 | A1 | 7/2010 | Rijssenbeek et al. | |
| 2010/0190047 | A1 | 7/2010 | West et al. | |
| 2011/0136017 | A1 | 6/2011 | Singh et al. | |

OTHER PUBLICATIONS

Guillermo Daniel Zappi et al.; Title : "Electrochemical Cells, and Related Devices", U.S. Appl. No. 13/173,320, filed Jun. 30, 2011; 29 Pages.

* cited by examiner

*Primary Examiner* — Ladan Mohaddes
(74) *Attorney, Agent, or Firm* — Francis T. Coppa

(57) ABSTRACT

An electrochemical cell is presented. An anode compartment in the cell contains a sacrificial metal in an amount between about 10 volume percent and about 40 volume percent, based on the volume of the compartment. The sacrificial metal has an oxidation potential less than the oxidation potential of iron. An energy storage device including such an electrochemical cell is also provided.

16 Claims, 3 Drawing Sheets

ELECTROCHEMICAL CELLS

BACKGROUND

The invention relates generally to an electrochemical cell, and in some specific embodiments, to a high-temperature, rechargeable electrochemical cell, and related devices.

A battery is an essential component used to store a portion of the energy in mobile systems such as electric vehicles, hybrid electric vehicles and other types of vehicles and non-vehicles (for example, locomotives, off-highway mining vehicles, marine applications, buses and automobiles), and for stationary applications such as uninterruptible power supply (UPS) systems and "Telecom" (telecommunication systems). The high-temperature sodium-metal halide electrochemical cells are generally targeted for use in locomotives; telecommunication, and uninterruptible power supply (UPS) batteries. These cells could potentially offer high energy density, high power density, longer cell life, and lower cost-requirements for many of these applications.

Normally, a battery is made up of many cells. Current development of these batteries is focused on performance and cell life. A number of factors can affect performance and limit the cell life. The primary factor may be unreliability of a separator. The most common separator used in these cells is beta"-alumina solid electrolyte (BASE), which is a sodium conducting ceramic.

It should be noted that thermal cycling, pressure differential, sodium-wicking, and vibrations in the cell, during use, may damage the separator in some circumstances. The damaged separator may lead to electrochemical corrosion of the casing (e.g. a steel casing), and a large thermal excursion in the cell. Usually, when the separator breaks, a metallic short is formed, allowing the battery to operate with the failed cell. However, in some cases, high temperature conditions, combined with the corroded cell casing, may allow the cell's chemical components to breach the casing, which can make the battery inoperable.

Development work has been undertaken on different battery designs to avoid and/or solve the corrosion problem. One way to avoid the corrosion of the cell is by providing effective thermal and electrical conductance between the core of the cell and the casing. However, there may be significant limitations in current designs to perform these functions effectively. Also, the currently available designs are not suitable to reduce or prevent the corrosion of the housing significantly.

It would therefore be desirable to develop a new cell design, with improved thermal and electrical management, for various battery applications.

BRIEF DESCRIPTION

Some embodiments of the present invention provide an electrochemical cell. The cell comprises a sacrificial metal disposed within an anode compartment in an amount between about 10 volume percent and about 40 volume percent, based on the volume of the compartment. The sacrificial metal has an oxidation potential less than the oxidation potential of iron.

According to some embodiments of the present invention, the cell comprises a separator disposed in a housing that includes iron. An anode compartment in the cell comprises an alkali metal and a sacrificial metal, wherein the sacrificial metal is present in an amount between about 10 volume percent and about 40 volume percent, based on the volume of the compartment. The sacrificial metal has an oxidation potential less than the oxidation potential of iron.

An energy storage device is provided in some embodiments of the present invention. The device includes a plurality of electrochemical cells that are in thermal and electrical communication with each other.

DRAWINGS

These and other features, aspects, and advantages of the present invention will become better understood when the following detailed description is read with reference to the accompanying drawings, in which like characters represent like parts throughout the drawings, wherein.

DETAILED DESCRIPTION

Approximating language, as used herein throughout the specification and claims, may be applied to modify any quantitative representation that could permissibly vary, without resulting in a change in the basic function to which it is related. Accordingly, a value modified by a term or terms, such as "about", is not limited to the precise value specified. In some instances, the approximating language may correspond to the precision of an instrument for measuring the value.

In the following specification and claims, the singular forms "a", "an" and "the" include plural referents, unless the context clearly dictates otherwise. All amounts set forth herein are provided in volume percent unless otherwise indicated. The disclosed amount ranges are inclusive and combinable. For example, an amount "between about 10 volume percent and about 40 volume percent", is inclusive of the endpoints and all intermediate values.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable. For example, in some circumstances, an event or capacity can be expected, while in other circumstances, the event or capacity cannot occur. This distinction is captured by the terms "may" and "may be".

As used herein, the term "anodic material" refers to a material that accepts electrons during charging, and is present as part of a redox reaction. The term "cathodic material" refers to a material that supplies electrons during charging and is also present as part of the redox reaction. The cathodic material is present as a participating electrochemical reactant, either in its oxidized or reduced state, or at some state between full oxidation and reduction. An electrolyte, as used herein, is a medium that provides the ion transport mechanism between the positive and negative electrodes of a cell, and may act as a solvent for the oxidized form of the electrode material. Additives that facilitate the ion transport mechanism, but do not themselves provide the mechanism, are distinguished from the electrolyte itself.

As used herein, the term "high temperature" generally refers to temperatures above about 250 degrees Celsius (° C.), unless otherwise indicated.

Figure 1:
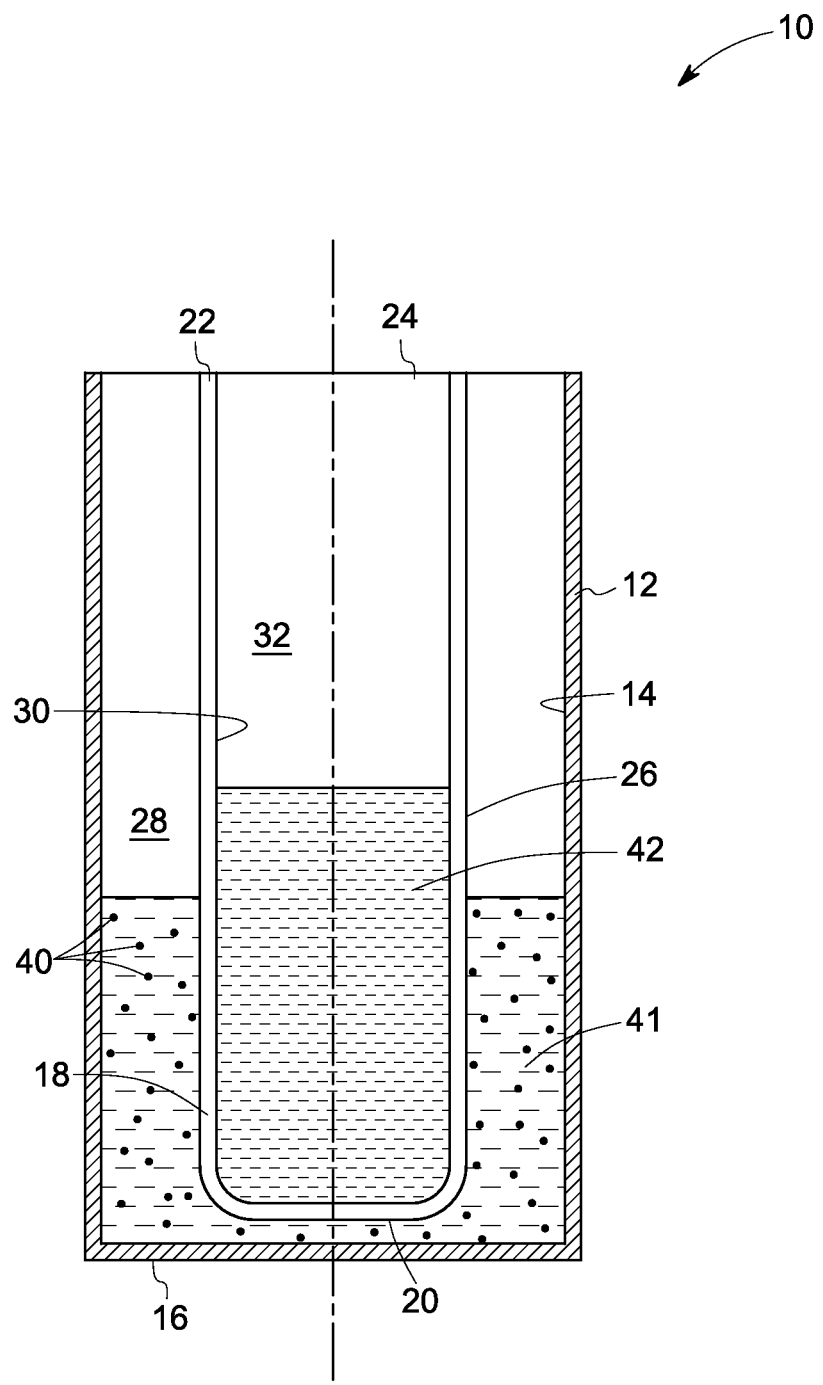
FIG. 1 is a schematic of an electrochemical cell according to an embodiment of the present invention.

FIG. 1 illustrates a schematic of an electrochemical cell 10, according to one embodiment of the invention. The electrochemical cell 10 includes a housing 12 having an interior surface 14 that defines a volume; and has a base 16. The housing 12 may also be referred to as "casing." In one embodiment, the housing 12 may have a circular or elliptical cross-section. In another embodiment, the housing 12 may be polygonal in cross-section, and may have a plurality of corner regions. In such instances, the housing 12 of the electrochemical cell 10 may be square in cross-section, and have four corner regions. With regard to the material, the housing 12 is generally made of a metallic material. Suitable metallic materials may include nickel, iron, or molybdenum. Specific examples may be mild steel, stainless steel, nickel-coated steel, and molybdenum-coated steel.

The electrochemical cell 10 includes a separator 18 disposed in the volume of the housing 12. The separator 18 is usually an ion-conducting solid electrolyte. Suitable materials for the separators may include beta'-alumina, beta"-alumina, beta'-gallate, beta"-gallate, or zeolite. In specific embodiments, the separator 18 includes a beta"-alumina solid electrolyte (BASE).

The separator 18 may be characterized by a selected ionic conductivity. The resistance of the separator 18 (i.e., across its thickness) may depend in part on the thickness of the separator wall itself. A suitable thickness can be less than about 5 millimeters. In one embodiment, the thickness of the separator wall may be in a range from about 0.5 millimeter to about 5 millimeters. In certain embodiments, the thickness may range from about 1 millimeter to about 2 millimeters In the illustrated embodiment, the separator 18 may be cylindrical, elongate, tubular, or cup-shaped, with a closed-end 20 and an open-end 22 for a cylindrical or tubular cell. In one embodiment, the separator may be substantially planar; and the corresponding cell may be a planar electrochemical cell. Referring to FIG. 1 again, the open-end 22 of the separator 18 may be sealable, and may be a part of the separator assembly that defines an aperture 24 for filling the separator 18 with a material during the manufacturing process. In one instance, the aperture 24 may be useful for adding the cathodic material. The closed-end 20 of the separator 18 may be pre-sealed, to increase the cell integrity and robustness.

The separator 18 may have a cross-sectional profile that may be a circle, an oval or ellipse, a polygon, a cross-shape, or a star shape, for example. In some particular embodiments, the separator may have a cross sectional profile in the shape of a rugate. Such a shape usually includes a plurality of lobe portions and valley (depression) portions (also referred to as "lobes" and "valleys"), in an alternating pattern. The rugate, which may provide a cloverleaf shape, may increase the overall, available surface area of the separator, for a given volume.

With continued reference to FIG. 1, the housing 12 is generally a container that defines an anode compartment 28 between an interior surface 14 of the housing 12, and an anode surface 26 of the separator 18. The separator 18 further has a cathode surface 30 that defines a portion of a cathode compartment 32. The cathode compartment 32 is disposed within the anode compartment 28, in these instances. Moreover, the anode compartment 28 is in ionic communication with the cathode compartment 32, through the ion-conducting separator 18. The anode compartment 28 and the cathode compartment 32 further include current collectors (not shown), to collect the current produced by the electrochemical cell. Optionally, the casing may serve as the anode current collector.

In one embodiment, the anode compartment 28 contains an anodic material 41; and the cathode compartment 32 contains a cathodic material 42. Typically, the anodic material 41 includes an alkali metal. An alkali metal ion is transported across the separator 18, between the anode compartment 28 and the cathode compartment 32. The anode compartment 28 may receive and store a reservoir of the anodic material 41. Non-limiting examples of the anodic material 41 may include lithium, sodium, or potassium. The anodic material 41 is usually molten during use. In one embodiment, the anodic material 41 is sodium.

In some embodiments, the anodic material 41 may include one or more additives. One example is a metallic oxygen scavenger. Examples of the metal oxygen scavengers may include one or more of manganese, vanadium, zirconium, aluminum, or titanium. Other useful additives may include materials that increase wetting of the separator surface by the molten anodic material 41. The amount of additives present is usually no greater than about 1 volume percent (for each additive).

Figure 2:
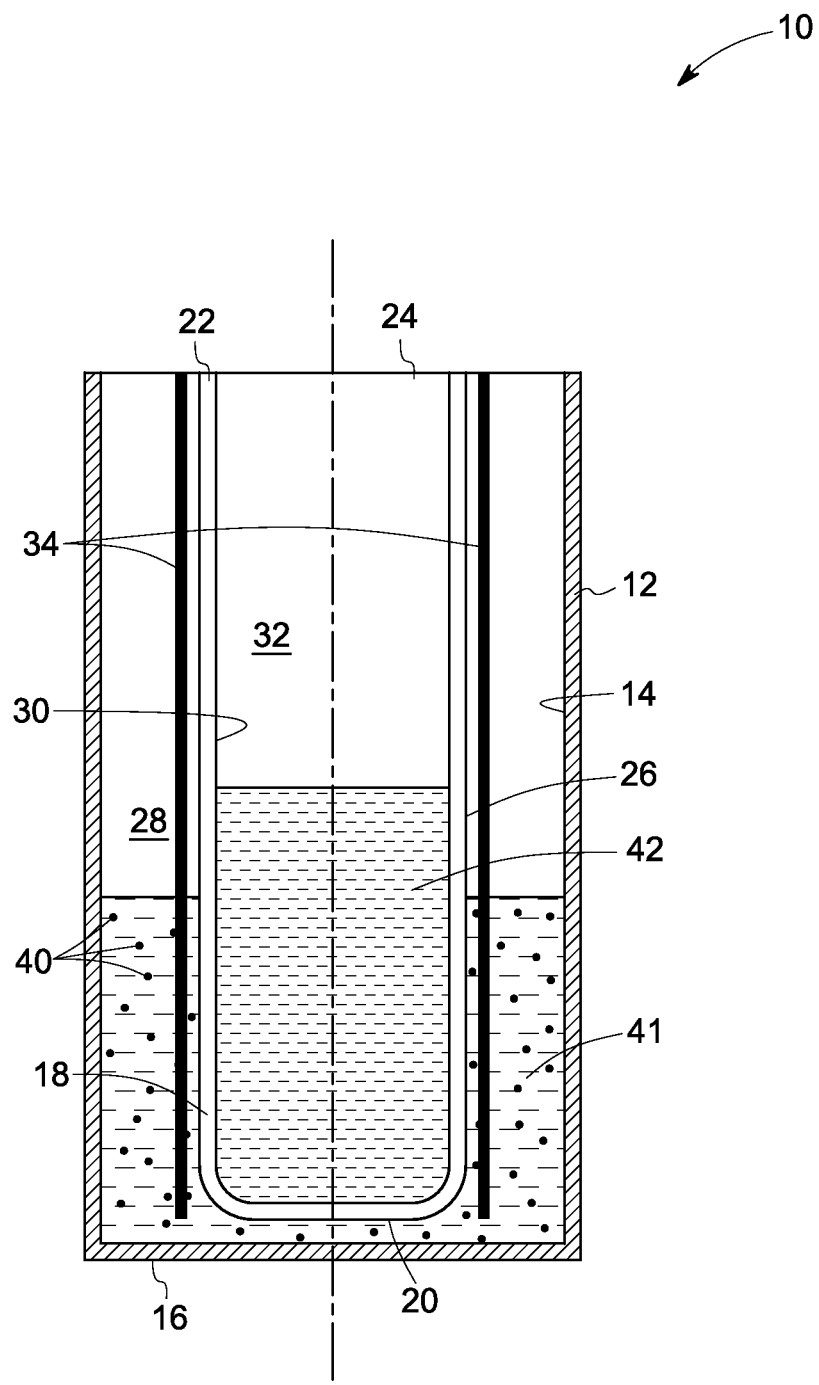
FIG. 2 is a schematic of an electrochemical cell according to another embodiment of the present invention.

In some embodiments, the anode compartment 28 may include a shim structure 34 disposed adjacent to the anode surface 26 of the separator 18, as illustrated in FIG. 2. (In all of the figures, identical element numbers refer to common or similar features, unless otherwise noted). A single shim-structure, or multiple shim-structures, may generally wrap around the separator. The shim-structure/structures may be in the form of a single-shim or a double-shim, as described in Patent Application Publication No. U.S. 2010/0178546 A1, filed on 9 Jan. 2009; and patent application Ser. No. 13/173,320, filed on 30 Jun. 2011, which are incorporated herein by reference. These shim-structure/structures 34 can perform several functions, such as providing a structure for electrical and thermal conduction within the cell, and also providing enhanced transport and utilization of the anodic material.

The cathodic material 42 may exist in elemental form, or as a salt, depending on the state of charge for a particular electrochemical device (i.e., in regard to the ratio of the forms of material which are present). The cathodic material may contain a metal, and the salt-form of the cathodic material may be a metal halide. Suitable metals for use as the cathodic material may include aluminum, nickel, zinc, copper, chromium, tin, arsenic, tungsten, molybdenum, iron, and various combinations thereof. The halide of the metal may be chlorine, fluorine, bromine, iodine, or various combinations thereof.

The cathodic material 42 can be self-supporting or liquid/molten. In one embodiment, the cathodic material 42 is disposed on an electronically conductive support structure. The support structure does not undergo any chemical reaction during the charge/discharge, but does support the cathodic material during chemical reactions. The support structure can be in a number of forms, such as a foam, a mesh, a weave, a felt, or a plurality of packed particles, fibers, or whiskers. In one embodiment, a suitable support structure may be formed from carbon. An exemplary carbon form is reticulated foam. The support structure may also be formed from a metal. The cathodic material can be secured to an outer surface of the support structure. In some instances, the support structure can have a relatively high surface area, e.g., at least about 0.3 square meters per milliliter.

A sulfur or a phosphorous-containing additive may be disposed in the cathodic material. For example, elemental sulfur, sodium sulfide or triphenyl sulfide may be disposed in the cathodic material. The presence of these additives in the cathodic material may reduce or prevent recrystallization of salts, and grain growth.

The cathode compartment 32 further includes a molten electrolyte (not shown separately), generally, infused with the cathodic material 42. The molten electrolyte transports the ions from the solid separator 18 to the cathodic material, and vice-versa. In one embodiment, the molten electrolyte includes a binary salt including an alkali metal halide and aluminum halide. The alkali metal halide includes the alkali metal used as the anodic material (discussed above) in the cell 10. In a specific embodiment, the molten electrolyte is sodium tetrachloroaluminate ($NaAlCl_4$). In some embodiments, the molten electrolyte may include an additional metal halide, and forms a ternary or quaternary electrolyte.

The melting temperature of the molten electrolyte and the temperature-dependent, ion-conductivity of the solid separator are primary factors in determining the minimum operating temperature of the cell. For example, the melting temperature of the molten electrolyte $NaAlCl_4$ may be about 150 degrees Celsius. In some instances, optimum performance of the cell is generally obtained at a temperature greater than about 250 degrees Celsius. In one embodiment, the operating temperature may be in a range from about 270 degrees Celsius to about 350 degrees Celsius.

Typically, multiple electrochemical cells are arrayed adjacent to each other in an energy storage device (e.g. a battery pack), and are interconnected in one of a variety of patterns, depending on the output requirement of the energy storage device, and on the end use application. The cells are electrically connected to each other in series or in parallel arrangements. Sometimes, the battery pack or battery may fail, due to the damage to a single cell.

One failure mechanism may be initiated when the solid separator cracks, or otherwise becomes damaged. When the solid separator is breached, the molten electrolyte (from the cathode compartment) comes into contact with the anodic material (for example, sodium), and allows for electronic shorting. The battery still may continue to operate, and to continue cycling with a shorted cell (or failed cell). During the operation of the battery, the excess electrolyte, over time, may come into contact with the housing (or casing) of the cell, and can form a new electrochemical cell (i.e. a galvanic cell). This galvanic cell involves reduction and oxidation of iron (from the cell housing) and the cathodic material, and can lead to electrochemical corrosion of the housing. For this reason, the molten electrolyte may also be referred to as "corrosion material."

As used herein, "corrosion" is a chemical reaction occurring by an electrochemical mechanism. During corrosion, two reactions occur: (i) oxidation, where electrons leave a metal, resulting in the conversion of the metal to a metallic salt; and (ii) reduction, where the electrons are used to convert the metallic salt to metal. For example in the case of some of the electrochemical cells currently in use, as corrosion takes place, the oxidation and reduction reactions occur; and ferrous chloride forms on the surface of the casing metal (e.g., steel) so that some regions of the casing becomes thinned and even breached.

In a cell, the anodic material (e.g., sodium) typically balances the cathodic material (e.g., nickel chloride). As discussed previously, the anodic material conducts through the separator, to communicate between the anode compartment and the cathode compartment, during charging and discharging. It may be possible sometimes, that in case of breaching, no corrosion occurs, if the anodic material is available in a sufficient amount to react with the cathodic material. However, those skilled in the art are familiar that, sometimes, when the separator cracks or damages, the anodic material may not be available to react with the cathodic material. The reasons may include a small amount of the anodic material present in the discharge state of the cell, and/or sedimentation of the anodic material at the bottom of the container.

Additionally, in some cases, the cell resistance of the shorted cell is very high, which results in resistive heating, especially if the short occurs at the state of discharge. The corrosive material which leaks from the cathode compartment into the anode compartment, combined with the high temperature of the cell, may cause accelerated breaching of the housing. The corrosive material may attack the adjacent cells in the battery pack, which may ultimately lead to failure of the entire battery pack.

The embodiments of the invention described herein address the noted shortcomings of the state of the art. In one embodiment, the anode compartment 26 (FIGS. 1 and 2) further includes a sacrificial metal, i.e., in addition to the primary anodic material noted above, e.g., lithium, sodium, or potassium. As used herein, the term "sacrificial metal" refers to a metal or a metal alloy that has a more "active" voltage, i.e., a more negative oxidation potential than the metal of the housing 12 (such as the iron present in steel), and acts as a galvanic anode. In one embodiment, the oxidation potential of the sacrificial metal is less than the oxidation potential of iron. The difference in oxidation potentials of the two metals (the sacrificial metal and iron) means that the sacrificial metal corrodes, and the sacrificial metal is consumed in preference to the housing metal. This effectively stops or inhibits the oxidation reactions on the housing surface, by transferring them to the sacrificial metal anode, which will be sacrificed in favor of the housing 12 under protection.

In one embodiment, the sacrificial metal is one that is electrically and thermally conductive. The sacrificial metal may be a single metal, or an alloy. Non-limiting examples of sacrificial metals are manganese, titanium, magnesium, zinc, aluminum, chromium, or various combinations thereof. The sacrificial metal does not conduct through the ion-conducting solid separator, and does not participate in the cell reaction. Advantageously, the sacrificial metal is usually available to react with the cathodic material in case of breaching.

As used in this disclosure, the term "sacrificial metal" is not meant to include an alkali metal such as lithium, sodium, or potassium, which are typically used as the anodic material. Although these alkali metals may have an oxidation potential less than the oxidation potential of iron, the "sacrificial metal" refers to an additional metal in the anodic material within the anode compartment, excluding the alkali metals.

In some specific embodiments, the sacrificial metal is zinc, or a zinc-containing alloy. In some embodiments, the sacrificial metal may be brass. Typically, brass is an alloy of copper and zinc. Gamma-brass may be desirable because of its low melting temperature. As used herein, "gamma-brass" refers to an alloy of copper and zinc in which the percentage of copper may range from about 1% to about 30%, and more specifically, to about 15%. Furthermore, brass, as used herein, does not contain lead.

In one embodiment, the sacrificial metal may be present in an amount of at least about 10 volume percent, based on the total volume of the anode compartment 26. In some embodiments, the sacrificial metal may be present in an amount from about 10 volume percent to about 40 volume percent, and in some specific embodiment, from about 20 volume percent to about 35 volume percent, based on the total volume of the anode compartment.

In most embodiments, the sacrificial metal is used in powder form. However, the metal can be present in a variety of shapes or forms, e.g., shots, beads, particulates, fibers, platelets, whiskers, or a combination of two or more of the foregoing. In the case of particles, the sacrificial metal may be used in a form with a specified size, particle size distribution, average particle surface area, particle shape, and particle cross-sectional geometry. Other forms of the material may be characterized by other relevant parameters, e.g., an aspect ratio in the case of fibers or whiskers.

In one embodiment, the sacrificial metal may also be coated onto a non-metal core, to form a core-shell structure. Other suitable forms may be a continuous structure or component, for example a shim, a rod, or the like. Moreover, the sacrificial metal may be coated on the interior surface of the housing to prevent it from corrosion. The coating may be applied by a variety of processes, including hot dip, electroplating, electroless plating, and spray, e.g., flame spray, and plasma spray. These techniques are generally known in the art. A hot dip technique is sometimes of special interest because of being capable of applying a relatively thick coating, for example, greater than about 100 microns in thickness.

Furthermore, in some embodiments, the particles 40 of the sacrificial metal may be distributed uniformly within the anodic composition material 41, as illustrated in FIG. 1 and FIG. 2. In some other embodiments, the sacrificial metal may be randomly distributed within the anodic composition.

Figure 3:
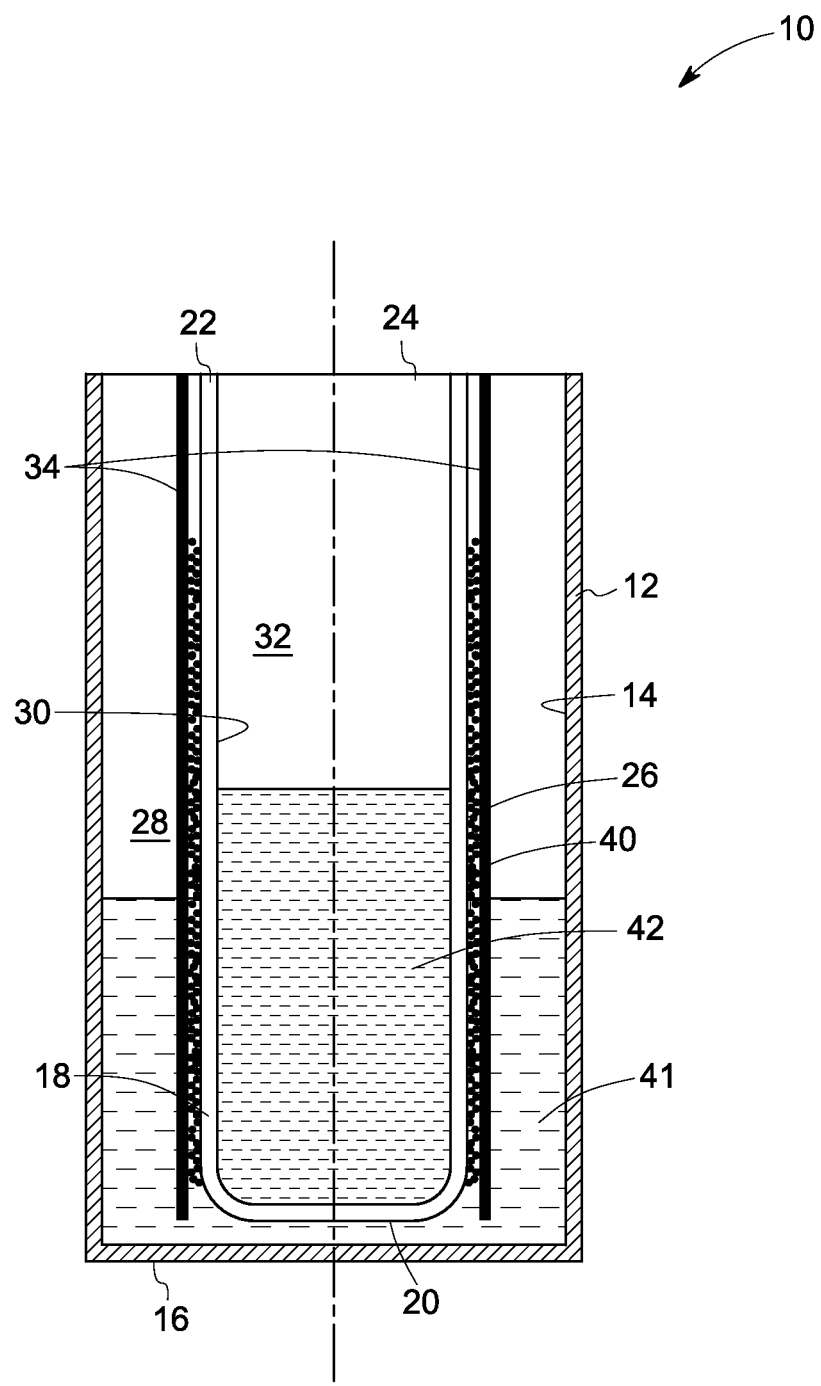
FIG. 3 is a schematic of an electrochemical cell according to yet another embodiment of the present invention

The powder of the sacrificial metal is usually disposed within the anode compartment 28 during manufacturing of the cell 10. Moreover, in some instances, the sacrificial metal may be disposed adjacent to or over the anode surface 26 of the separator 18 (i.e., the surface facing the anode compartment), so that the sacrificial metal may be immediately available to be consumed in case of breaching of the separator. FIG. 3 illustrates such an embodiment, where the powder or the particles 40 of the sacrificial metal may be disposed between the shim-structure 34 and the anode surface 26 of the separator. The sacrificial material may be disposed in the entire interfacial region between the anode surface and the inner surface of the shim, or in a portion of that region.

The sacrificial metal may also contribute to thermal management of the electrochemical cell 10, under either operating or failed conditions. (An electrochemical cell usually operates in a temperature range of from about 250 to about 380 degrees Celsius. In certain embodiments, the operating temperature of the cell may reach up to about 400 degrees Celsius). The sacrificial metal present in the anode compartment may provide effective thermal management in the cell by reducing the cell temperature. The temperature reduction mechanisms may generally include reduction in the rate of increase of the cell temperature, and conduction of heat away from the core (i.e., the cathode) of the cell to the housing. For example, being thermally conductive, the sacrificial metal may spread heat throughout the anode compartment, to avoid formation of concentrated hot spots. Also, the mass of the sacrificial metal adds thermal inertia to the anode compartment, and may slow down the rate of the temperature increase.

The sacrificial metal may further improve the thermal management of the cell 10, if it is selected such as to have a low melting temperature. In one embodiment, the sacrificial material may be one having a relatively low melting temperature, e.g., less than about 500 degrees Celsius. In some specific embodiments, the melting temperature ranges from about 350 degrees Celsius to about 450 degrees Celsius. Furthermore, the low melting temperature of the sacrificial metal may be desirable to meet operating requirements of the cell for some situations. For example, at a high temperature, usually about 450 degrees Celsius or more, the cathode headspace pressure can cause the separator to fracture, or damage. This could, in turn, result in damage to or failure of sealing mechanisms of the cell.

Because of the low melting temperature, the sacrificial metal may adsorb a portion of the excess heat within the cell due to the sacrificial metal's thermal mass and its latent heat of fusion. Furthermore, the molten metal may provide a low-resistance pathway between the cathode compartment and the housing, which may reduce resistive heating, in case of a failed cell. For example, in a shorted or failed cell (as discussed previously), the temperature may increase rapidly due to the resistive heating, which may result in over-heating of the cell. In these instances, the sacrificial metal present in the anode compartment may prevent or reduce the resistive heating of the shorted cell, by providing electrical conduction between the cathode compartment and the housing.

In accordance with an embodiment of the invention, an energy storage device includes a plurality of the electrochemical cells that are, directly or indirectly, in thermal and/or electrical communication with each other. Those of ordinary skill in the art are familiar with the general principles of such devices.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An electrochemical cell, comprising a separator having an anode surface defining a portion of an anode compartment and a cathode surface defining a portion of a cathode compartment, wherein the anode compartment comprises sodium in elemental form and a sacrificial metal in an amount between about 10 volume percent and about 40 volume percent based on the volume of the anode compartment, wherein the sacrificial metal comprises zinc, and has an oxidation potential less than the oxidation potential of iron.

2. The electrochemical cell of claim 1, wherein the separator is disposed in a housing.

3. The electrochemical cell of claim 2, wherein the housing comprises iron.

4. The electrochemical cell of claim 2, wherein the housing comprises steel.

5. The electrochemical cell of claim 1, wherein the sacrificial metal has a melting temperature less than about 500 degrees Celsius.

6. The electrochemical cell of claim 5, wherein the sacrificial metal has a melting temperature ranging from about 350 degrees Celsius to about 450 degrees Celsius.

7. The electrochemical cell of claim 1, wherein the sacrificial metal comprises brass.

8. The electrochemical cell of claim 1, wherein the sacrificial metal is present in an amount between about 20 volume percent and about 35 volume percent.

9. The electrochemical cell of claim 1, wherein the sacrificial metal is present in the form of powder.

10. The electrochemical cell of claim 1, wherein the sacrificial metal is present in the form of beads, shots, particulates, platelets, fibers, whiskers, or a combination thereof.

11. The electrochemical cell of claim 2, wherein the cell further comprises a shim-structure adjacent to the anode surface, wherein the sacrificial metal is distributed over at least a portion of the anode surface, between the shim-structure and the separator.

12. The electrochemical cell of claim 1, wherein the cathode compartment contains a metal halide material.

13. The electrochemical cell of claim 12, wherein the metal halide comprises a chloride, a bromide, an iodide or combinations thereof.

14. An electrochemical cell, comprising a separator disposed in a housing comprising iron; and having an anode surface defining a portion of an anode compartment and a cathode surface defining a portion of a cathode compartment, wherein the anode compartment comprises molten sodium in elemental form and a sacrificial metal, wherein an amount of the sacrificial metal is between about 10 volume percent and about 40 volume percent based on the volume of the compartment; the sacrificial metal comprises zinc, and has an oxidation potential less than the oxidation potential of iron; and the cathode compartment comprises a metal halide material.

15. An energy storage device comprising: a plurality of the electrochemical cells of claim 14, wherein the cells are in thermal and electrical communication with each other.

16. The electrochemical cell of claim 12, wherein the metal halide material comprises nickel chloride.

* * * * *